2,917,401

ANTISTATIC COMPOSITION AND PREPARATION OF THE SAME

Yukio Noguchi, Meguro-ku, Tokyo, Mitsuji Nakatomi, Minato-ku, Tokyo, and Chojiro Muto, Naka-Gun, Kanagawa-ken, Japan, assignors to Mitsubishi Rayon Co., Ltd., Tokyo, Japan No Drawing. Application December 20, 1955
Serial No. 554,148

5 Claims. (Cl. 106—287)

The present invention relates to an antistatic composition or particularly a composition containing silica colloid and the preparation of the same. More particularly the present invention relates to a composition which will prevent static electricity from being generated in synthetic resins such as acrylic, polystyrene and vinyl resins and synthetic fibers such as nylon, vinylon and acetate. Static electricity has contributed much to the field of painting and dust collection but, on the other hand, the presence of static electricity in the field of explosive production, high pressure apparatuses, hospital operation rooms, etc., is unfavorable and may in a moment cause loss of life and property.

Static electricity will also be generated by the friction between fibers and apparatus members in spinning synthetic fibers and will result in the deterioration of quality, the reduction of efficiency in production and the remarkable damage of appearance of the products because synthetic resins such as specifically methacrylic resin, vinyl chloride resin and polystyrene resin are so high in electrical chargeability as to strongly attract dust diffused in air. Moreover, if the article made of such resin is carelessly wiped with dry cloth to clear off the dust adhering thereto, not only the smooth surface will be damaged but also stronger static electricity will be generated by the friction between the dry cloth and resin surface, resulting in all the more increasing the adherence of dust.

Various researches have been made to prevent the generation of static electricity. As an example, there is a method wherein a radioactive substance is mixed into an electrically chargeable body and air around the body is ionized or X-ray is projected. However, such method is so costly and is so short in the effective period as to be rather low in practicability. There has recently been conceived a method wherein the surface is surrounded by a conductive substance and an electric current is induced and is made to flee. To attain this object, a surface active agent is used today. Even in the case of said method, the period effective to prevent electrical charging is above 2 to 3 weeks at the longest. Said method has a defect that, when the product is washed with water, it will lose in a moment the ability to prevent electrical charging.

Some examples of hitherto used destaticizers for polystyrene and their characteristics are tabulated in the following:

| Product | Manuf. | Polishing Required | Tend to Smear | Effective At once | No. of Rubbings | No. of Washings |
|---|---|---|---|---|---|---|
| 4% Carbowax, 1% Tergitol in Water. | Carbide & Carbon, New York, N.Y. | Some | Slight | Excl | 10 | 0 |
| Dust Free Cleaner | Park Chem. Co., Detroit, Mich. | Very little | Very little | Excl | Over 12 | 0 |
| 1% Tergitol in Water | Carbide & Carbon, New York, N.Y. | Some | Slight | Excl | 5 | 0 |
| D-Start B | Roxbury Chem. Works, Centerdale, R.I. | Little, none | Very little | Excl | Over 12 | 0 |
| Logostat R-2018 | Bee Chem. Co., Chicago, Ill. | Little | do | Excl | do | 0 |
| H-145 | Du Pont, Arlington, N.J. | Some | Slight | Excl | do | 0 |
| Anstac PS | Chem. Development Corp., Boston Mass. | Little or none | Almost none | Excl | 3 | 0 |
| Electrosol | M. J. Ainsworth, Northridge, Calif. | Appreciable amount | Noticeable | Excl | Over 12 | 0 |

(From Static Dust Collection of Plastics, Plastic Technical Service, The Dow Chemical Company.)

As seen in the above table, the antistatic effect as of just after application is excellent but will be made null by washing.

Surface resistivity of various materials will vary due to humidity, some examples being tabulated below:

*Surface resistivity—ohms*

| Material | At Percent Relative Humidity | | | Comments |
|---|---|---|---|---|
| | 30 | 60 | 90 | |
| Polystyrene | $>5 \times 10^{16}$ | $>5 \times 10^{16}$ | $>5 \times 10^{16}$ | Known to be $10^{19}$ to $10^{21}$. |
| Polyethylene | $>5 \times 10^{16}$ | $>5 \times 10^{16}$ | $3 \times 10^{10}$ | Known to be lower than Polystyrene. |
| Methyl methacrylate | $>5 \times 10^{16}$ | $>5 \times 10^{16}$ | $7 \times 10^{15}$ | Do. |
| Ethylcellulose | $>5 \times 10^{16}$ | $>5 \times 10^{16}$ | $3 \times 10^{13}$ | Usually considered lower than methacrylate or Polyethylene-dependent upon plasticizer. |
| Geon 2046 | $>5 \times 10^{16}$ | $3 \times 10^{15}$ | $2 \times 10^{11}$ | |
| Urea | $>5 \times 10^{16}$ | $9 \times 10^{14}$ | $2 \times 10^{12}$ | |
| Nylon #610 | $>5 \times 10^{16}$ | $10^{14}$ | $10^{13}$ | |
| Melamine | $4 \times 10^{15}$ | $10^{14}$ | $10^{13}$ | |
| Phenol Formaldehyde | $7 \times 10^{14}$ | $5 \times 10^{14}$ | $2 \times 10^{13}$ | |
| Paper | $3 \times 10^{12}$ | $10^{11}$ | $3 \times 10^{9}$ | |

It has been found according to our experiments that, when said resistivity is in the order of $10^{11}$, the antistatic object will be attained. For example, humidity in the operating room of a spinning factory is made 90% which is unfavorable for the health of operators.

An object of the present invention is to provide an antistatic composition which can be used under ordinary conditions without the need of adjusting humidity to prevent electrical charging.

A further object of the present invention is to provide a composition whose life is long and whose antistatic character will not be reduced by washing.

Another object of the present invention is to provide an antistatic composition whereby a produced film has such microscopically fine pores as will prevent reflection and will increase penetration of light.

Another object of the present invention is to provide an antistatic composition which is high in adhesion to the surfaces of articles and in resistance to scratches and which is resistant to organic solvents.

Another object of the present invention is to provide a composition which is easy to manufacture and which will give dustproofness to the surfaces of articles.

Still another object of the present invention is to provide preparation and application of such composition.

According to the present invention, a colloidal solution having an antistatic character is produced by the reaction in the presence of water of a mixed solution of an alkyl acetate and a monovalent aliphatic alcohol with the addition of a silicon halide.

The alkyl acetate employed in the present invention may be methyl acetate, ethyl acetate, butyl acetate or any other alkyl acetate. The above exemplified three kinds of acetate are used most in view of their availability. The quality of the product obtained by using any of said three is favorable.

The alcohol to be employed may be a monovalent aliphatic alcohol such as methyl alcohol, ethyl alcohol or allyl alcohol. The effect of aromatic alcohols on the product is not favorable. Ethyl alcohol among the above mentioned alcohols is preferable. The alcohol to be employed is mixed with the acetate at the ratio of approximately 1:1 by weight.

A silicon halide having the general formula $SiX_4$ wherein X is selected from a group consisting of Cl, Br and I and may be the same or different, such as, for example, $SiCl_4$, $SiBr_4$, $SiI_4$, $SiCl_2Br_2$, $SiCl_3Br$, $SiClBr_3$ or $SiCl_3I$, is employed in the present invention, $SiCl_4$ giving the most favorable result.

The presence of water in the reaction system of the present invention is a prerequisite. When an anhydrous alcohol is to be employed, water is added by about 4 to 7% by volume to the mixed solution. When an alcohol containing water is to be used, it will no longer be necessary to add water. As a silicon halide, in general, will react with moisture in air and will thus fume, it is desirable for the reaction of the present invention to take place in an atmosphere of a low humidity. The reaction wherein a silicon halide is added is so explosive that said halide should be added drop by drop while the mixed solution of the alcohol and alkyl acetate is being stirred. The reaction is made to take place at the room temperature.

The colloidal solution thus produced has such high fluidity that it may be applied on an article without any further treatment such as dilution. When the colloidal solution is left for several days after it is prepared, the colloid grains will grow and white pollution will be caused often when the solution gels and is applied to an article. Before the solution completely gels, it is diluted to a desired density with the alcohol employed in the reaction or with a solution of said alcohol and alkyl acetate at the ratio of preferably 1:1. Once the solution is thus diluted, even when it is left thereafter, it will not further gel. Said solution can be applied to articles by any commercially used method such as brushing, dipping or blowing, the first two being preferable. The articles may be of glass, synthetic resins or synthetic fibers. When the solution is to be applied to fibers, the fibers are dipped in a mixture of the present composition in an oil or in a dilute solution of the present composition.

When the present composition is applied to a film of any substance, it will have a surface resistivity of the order of $10^{10} \sim 10^{11}$ ohms at a relative humidity of 60% at temp. of 20° C. This resistivity will not be reduced even if the film is washed.

The following examples are given to help the present invention to be understood and should be illustrative of the present invention but said invention should not be interpreted to be limited to these examples in any way:

Example 1.—When 500 parts of ethyl acetate with the addition of 550 parts of ethyl alcohol containing 10% water were made to react with the addition of 40 parts of silicon tetrachloride while being gradually stirred, a stable colloidal solution was obtained.

Example 2.—When 500 parts of methyl acetate with the addition of 600 parts of methyl alcohol containing 10% water were made to react with the addition of 40 parts of silicon tetrabromide while being gradually stirred and were left for 2 to 5 days after being cooled, a stable colloidal solution was obtained.

Example 3.—When 500 parts of ethyl acetate with the addition of 550 parts of $C_2H_5OH$ containing 10% water had 40 parts of $SiCl_4$ added thereto while being gradually stirred and were left for 3 to 4 days, a stable colloidal solution was obtained. When well washed and dried glass, cellulose acetate, and synthetic resins such as, for example, methylmethacrylic resin, and vinyl chloride were dipped in said solution, had the excess of the adhering solution removed and were dried, a very simple, stable and tough silica film could be formed thereon. It took 10 hours to dry at the atmospheric temperature, 2 hours at a temperature of 50 to 60° C.

In the case that a silica film is to be formed on the surfaces of optical glass and optical resins which require the effects of a very high degree of prevention of reflection, increase of penetration of light and protection of surfaces, the thickness of the film is adjusted by means of a special apparatus wherein the centrifugal force is applied.

The same effect can be seen even if methyl alcohol or allyl alcohol is employed in place of ethyl alcohol. It has also been confirmed that methyl acetate or butyl acetate can be employed in place of ethyl acetate.

In the case that the thickness of the silica film is to be adjusted by the concentration of the solution, the solution is diluted with a mixed solution having a composition ratio of 1:1 of alcohol to ethyl acetate.

Example 4.—When 60 to 100 parts of ethyl acetate with the addition of 110 parts of anhydrous ethyl alcohol and further of 10 parts of water were made to react with the addition of 8 parts of silicon tetrachloride while being gradually stirred, a colloidal solution having an antistatic character was obtained.

Example 5.—100 parts of ethyl acetate and 110 parts of anhydrous alcohol with the addition of 5 to 15 parts of water had 8 parts of silicon tetrachloride gradually added thereto and were well stirred to discharge hydrochloric acid gas, an antistatic colloidal solution was produced.

Example 6.—Even when an R—OH type alcohol such as methyl alcohol, propyl alcohol or butyl alcohol was used instead of said ethyl alcohol, an antistatic colloidal solution was obtained.

What we claim is:

1. A method of preparing a composition for forming an antistatic transparent film which comprises adding one part of $SiX_4$ wherein X is a member selected from the group consisting of Cl, Br and I to 25 parts of an about 1:1 mixture of an alkyl acetate and a monovalent alkanol wherein the alkyl groups of both contain from 1 to 4 carbon atoms, about 4 to 7% by volume of water, and stirring to remove free hydrogen halide gas produced in the reaction.

2. A method of preparing a composition for forming an antistatic and transparent film which comprises intimately mixing one part of alkyl acetate in which the alkyl group has from 1 to 4 carbon atoms and 1.1 parts of a monovalent alkanol containing 4 to 7% by volume of water, wherein the alkyl group has from 1 to 4 carbon atoms, adding one part of $SiCl_4$ to 25 parts of the mixture, stirring until free hydrochloric gas is removed and recovering the product sol.

3. A method of preparing a composition for forming an antistatic and transparent film, which comprises intimately mixing one part of alkyl acetate in which the alkyl group has from 1 to 4 carbon atoms and 1.1 parts of a monovalent alkanol containing 4 to 7% by volume of water, wherein the alkyl group has from 1 to 4 carbon atoms, adding one part of $SiCl_4$ to 25 parts of the mixture, stirring until free hydrochloric gas is removed and adding to the product an equal amount of 1:1 mixture of said alkyl acetate and alkanol.

4. A method according to claim 2 wherein the alkyl acetate is selected from the group consisting of methyl, ethyl and butyl acetates.

5. A method of preparing a composition for forming an antistatic and transparent film which comprises intimately mixing one part of alkyl acetate in which the alkyl group has from 1 to 4 carbon atoms and 1.1 parts of a monovalent alcohol containing 4 to 7% by volume of water and selected from the group consisting of methyl alcohol, ethyl alcohol, propyl alcohol, butyl alcohol and allyl alcohol, adding one part of $SiCl_4$ to 25 parts of the mixture, stirring until free hydrochloric gas is removed and recovering the product sol.

References Cited in the file of this patent

UNITED STATES PATENTS

| | | |
|---|---|---|
| 2,347,733 | Christensen | May 2, 1944 |
| 2,408,654 | Kirk | Oct. 1, 1946 |
| 2,431,873 | Kennely | Dec. 2, 1947 |
| 2,701,218 | Nickerson | Feb. 1, 1955 |

OTHER REFERENCES

Ellis: "Chemistry of Synthetic Resins" (1935), vol. 1, page 13.

Stannett: "Cellulose Acetate Plastics" (1950).

Ott et al.: "High Polymers" (1955), vol. V, pt. III, page 1462.